United States Patent [19]
Dixson et al.

[11] 3,922,909
[45] Dec. 2, 1975

[54] FUEL ECONOMY MONITORING SYSTEM FOR ENGINES OF VEHICLES

[75] Inventors: Bruce E. Dixson; John E. Gayton; Dennis J. Lowery; William F. Burke, all of Grand Junction, Colo.

[73] Assignee: Dixson, Inc., Grand Junction, Colo.

[22] Filed: Aug. 26, 1974

[21] Appl. No.: 500,400

[52] U.S. Cl. .................................. 73/115; 73/408
[51] Int. Cl.² ........................................ G01M 15/00
[58] Field of Search ....... 340/380; 73/115, 116, 408

[56] References Cited
UNITED STATES PATENTS

| | | | |
|---|---|---|---|
| 643,542 | 2/1900 | Sanford et al. | 73/408 X |
| 1,323,531 | 12/1919 | Hewitt | 73/115 |
| 2,678,431 | 5/1954 | Lewis | 340/380 X |
| 2,806,402 | 9/1957 | Ferris | 340/380 UX |
| 3,388,682 | 6/1968 | Whiting | 116/70 |
| 3,435,797 | 4/1969 | Chapman | 73/408 X |

*Primary Examiner*—Jerry W. Myracle
*Attorney, Agent, or Firm*—Roy E. Mattern, Jr.

[57] ABSTRACT

A fuel economy monitoring system for vehicle engines including a linear diaphragm vacuum motor connected to the intake manifold. Movement of the diaphragm is indicated by means of a multicolored filter and lamp arrangement which transmits colors through a fiber optic bundle, which colors are quickly observable by a driver within his peripheral vision to indicate by the observed engine intake manifold vacuum how the driver's throttle settings are affecting the fuel economy of the engine.

1 Claim, 5 Drawing Figures

FUEL ECONOMY MONITORING SYSTEM FOR ENGINES OF VEHICLES

BACKGROUND OF THE INVENTION

Some vehicles commonly display intake manifold vacuum with a dash-mounted dial gauge, but such instrumentation has not been generally successful in aiding drivers in improving their driving habits regarding throttle settings to maximize fuel economy. Although it may be demonstrated that observation of changes in intake manifold vacuum readings may be utilized by the driver to improve engine performance in regard to fuel consumption rates, most previous instrumentation requires the driver to be an expert driver in relating a vacuum reading to fuel economy for a particular vehicle. Moreover most previous instrumentation requires concentration and interpretation of a vacuum gauge to a degree that distracts the vehicle operator. The driver must take his eyes off the road for too long a period properly to observe and understand gauge readings. Therefore, this invention provides a better and different display method and apparatus for observation and throttle control by the driver.

SUMMARY OF ADVANTAGES

Due to shortages and price increases in the oil industry, and the environmental concern for more efficient combustion of fuel and decrease in pollution, there is a renewed and increased need for obtaining economical fuel consumption. There is an urgent demand for a device to assist the vehicle operator in achieving economical rates of fuel consumption by an engine of a motor vehicle, and by petroleum consuming engines wherever they might be used. The demand is particularly great in operating automobiles, trucks and boats, to provide an easily and quickly observable display instrument in the range of peripheral vision of a driver to provide the vehicle operator with a continuous and instantaneous indication of intake manifold vacuum, so that the operator can modify his or her throttle settings to maximize fuel economy.

The invention described herein meets the demand for such instrumentation whereby the operator is provided with easily and quickly interpreted color coded feedback information, generally related to his or her throttle settings and fuel economy. Consequently the driver adjusts the throttle setting during operation, improving driving habits, and thereby tending to maximize the fuel economy.

The invention involves the sensing of the intake manifold vacuum which has been previously found by others to be a good way of indicating fuel economy of the operation of an internal combustion engine. When an engine is idling or running at constant speed on level terrain, intake manifold vacuum remains constant and relatively high. As the engine is accelerated, manifold vacuum decreases as a greater amount of vaporized fuel is supplied by the engine carburetor, and a decrease in vacuum is measured. Because intake manifold pressure is essentially related to the volume of air-fuel mixture being consumed by an engine, it is found to be indicative of the rate of fuel consumption and therefore the economy of operation of an engine and the vehicle in which it may be installed. Thus to indicate poor performance, for example, a substantial decrease in intake manifold vacuum is presented in proportion to a wide departure from the most economical, steady rate engine operation, and a quickly observed display of such decrease in manifold vacuum induces a vehicle operator to moderate throttle settings, decreasing excessive throttle activation, and thereby he or she maximizes efficient fuel consumption.

An indicator mounted in the central or peripheral field of the driver's vision interprets and displays an easily observable signal, so the vehicle operator may react by changing throttle settings. The signal is displayed by using a fibre optic bundle with its end serving as its terminating lens, or a separate lens may be provided, which progressively picks up the changes and gradual transitions in color of a filter, such as from green to amber to red to read in proportion to decreasing manifold vacuum. The lens is small and contained in a housing which is easily mounted within or outside the passenger compartment, but always within the operator's field of vision so the color changes and transitions may be observed with the peripheral vision of the driver, whose concentration on the road ahead is not thereby impaired. The fibre optic display device offers a great improvement over a standard dial gauge readout of intake manifold pressure, which takes an expert driver to relate the gauge data on vacuum pressure to fuel economy for a particular vehicle.

As noted, the display lens receives its signal through a flexible fibre optic bundle, which connects to a sectional housing containing a transducer to convert the vacuum pressure caused movements into a color coded light signal. A commonly used and inexpensive diaphragm vacuum linear mechanism, connected to the intake mainfold, responds mechanically to variations in vacuum pressure. The diaphragm movement utilizing a piston like rod secured also to a filter frame causes translation of a multicolored transparent filter between a lamp and the oppositely positioned light receiving end of the fibre optic bundle. The filter is colored in green, amber and red, successively arranged increments, with the effect occurring, through use of the fibre optic bundle, of transitional and graduational shadings of color, so the color of the light transmitted through the fibre optic bundle will vary gradually in response to the changing vacuum pressure. An adjustable tension spring is used both to calibrate the transducer to the different vacuum ranges of various cars and trucks and also to enable a driver to adjust the sensitivity of the fuel economy monitoring system for the degree of fuel economy he or she may particularly desire. In operation, the displayed light color will change gradually from green to amber at moderate levels of acceleration, and then to red as less efficient, unnecessary pressure is applied to the accelerator, causing excessive use of fuel. By using the spring adjustment, the vehicle operator can vary the vacuum levels at which the color transitions occur.

DESCRIPTION OF DRAWING

The preferred embodiment of the fuel economy monitoring system is illustrated in the following figures:

FIGS. 3, 4 and 5 are schematic vertical sectional views of those components of the fuel economy monitoring system which are within and closely associated with the housing to indicate how the changes in the color of the filter are displayed as a signal in response to changes in engine manifold vacuum, the multicolored filter translating between a lamp and the light receiving end of the fibre optic bundle, wherein:

in FIG. 3, high manifold vacuum which is characteristic of constant speed driving or small acceleration driving performance is indicated by a green signal being displayed through fibre optic bundle to the display lens, and wherein in FIG. 4, lower vacuum which is characteristic of moderate acceleration is indicated by an amber signal, and wherein in FIG. 5, very low vacuum which is characteristic of excessive acceleration is indicated by a red signal.

DESCRIPTION OF PREFERRED EMBODIMENT

Installation of the Fuel Economy Monitoring System in a Motor Vehicle

Figure 1:
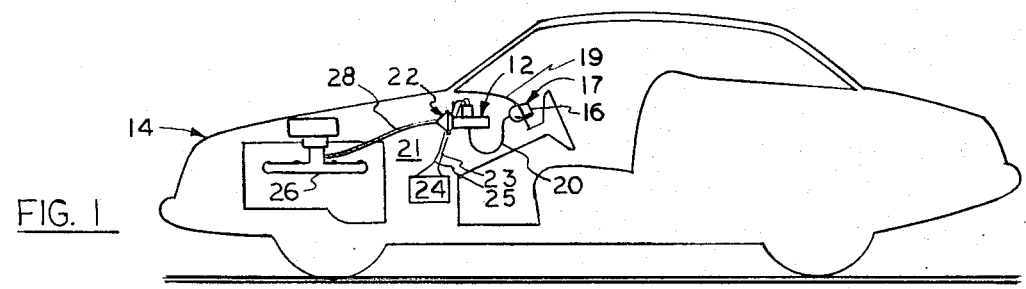
FIG. 1 is a schematic sectional view taken on a vertical plane through an automobile showing the optional mounting locations of components of the fuel economy monitoring system, inclusive of a dashboard mounted color change indicating means and an inside engine compartment mounting of the housing containing the sensing and transducing sub-assembly. It is to be understood that the housing containing the sensing and transducing sub-assembly may be mounted in any convenient location on the vehicle, and that the display color change indicating means may be mounted at any convenient location within the field of vision of the driver.
Figure 2:
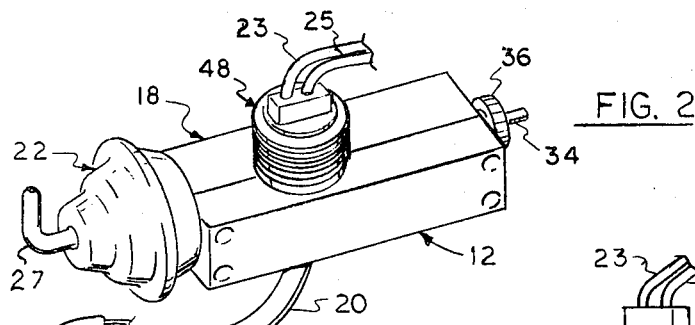
FIG. 2 is a perspective view of the fuel economy monitoring system, illustrating the indicating display and its optional dashboard mounting, the fibre optic bundle, the housing containing sensing and transducing units, the vacuum diaphragm linear mechanism which is externally mounted on the housing, the lamp sub-assembly which is also mounted on the housing, terminals for connection to the vehicle battery, and a receiving connection for securing a vacuum hose coming from the intake manifold of the engine.

In FIG. 1 the installation is shown of the fuel economy monitoring system 12 in a passenger automobile 14. The display lens 16 and its mounting sub-assembly 17 is positioned generally on the automobile dashboard 19 but may be mounted inside or outside of the vehicle but always in the field of view of the driver. He may immediately detect a change or transition in color in the lens 16, indicating to him or to her a change in the rate of fuel consumption. The changes in color originate in the sensing and transducing components, which are located in and on a sectional housing 18, that is in turn mounted in the vehicle engine compartment 21 or at other locations inside or outside the vehicle. The color changes are transmitted via a flexible fibre optic bundle 20 from the housing 18 to the display lens 16. Electrical power to operate the light 44 of the monitoring system 12 is received through connectors 23, 25, from the battery 24. The changes in engine manifold vacuum are transmitted to the housing 18 from the engine intake manifold 26 through vacuum hose 28.

Figure 3:
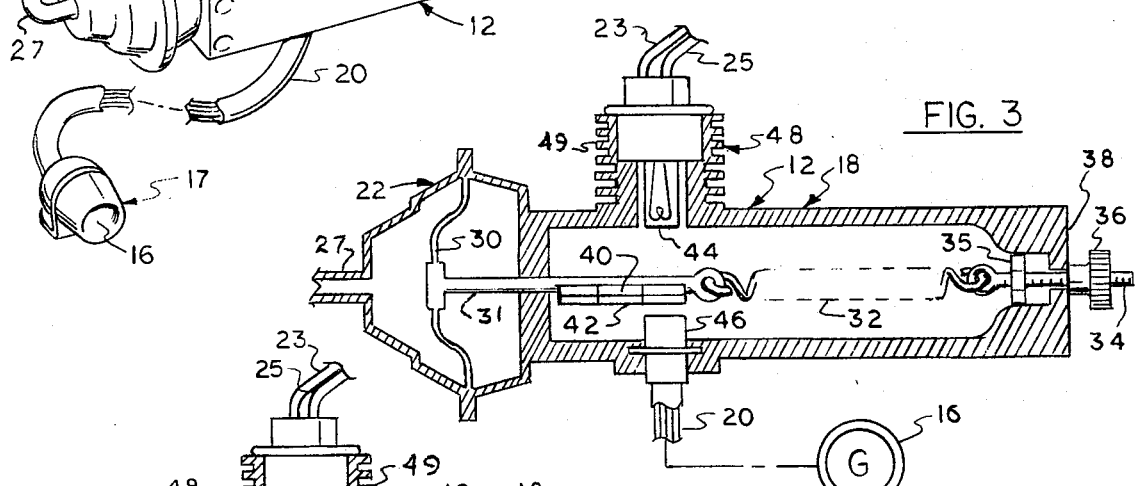
Figure 4:
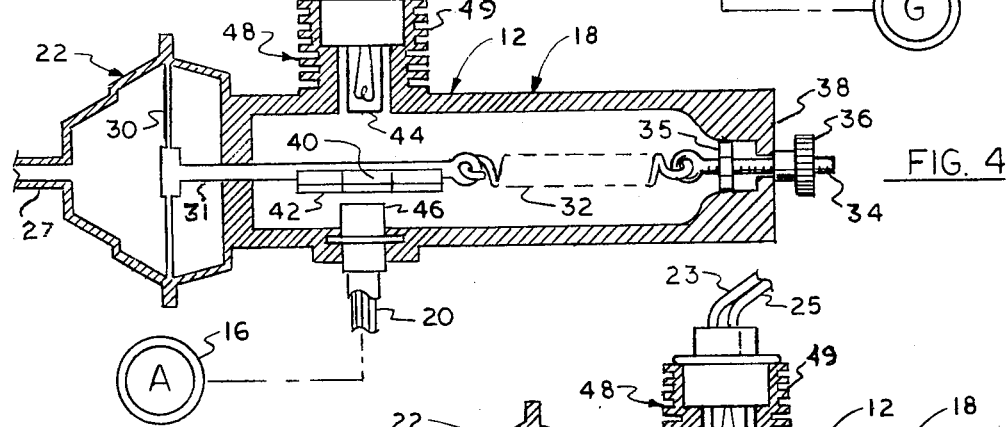
Figure 5:
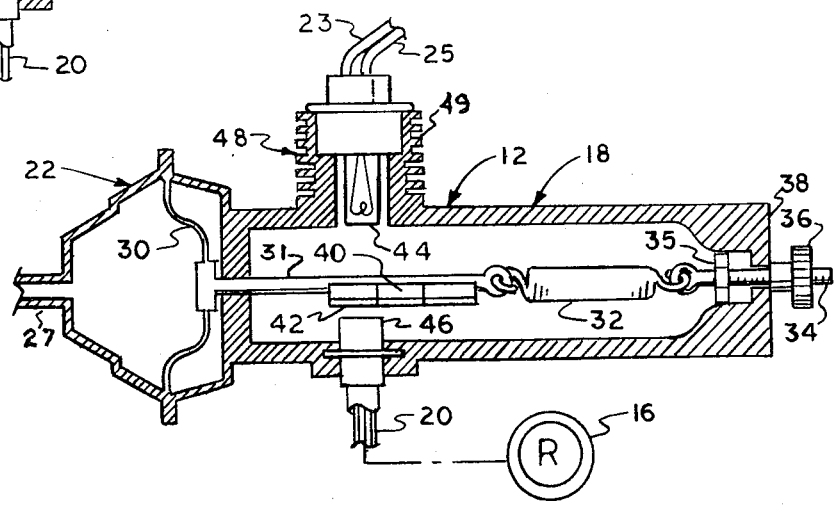

Sensing the Intake Manifold Vacuum to Indicate the Fuel Economy Being Realized During Engine Operations A vacuum diaphragm linear movement mechanism 22 is mounted on the housing 18 containing the sensing and transducing components, and it is connected at its fitting 27 to the engine intake manifold 26 by using flexible vacuum hose 28. Variations in vacuum pressure in the engine intake manifold 26 cause a diaphragm 30 of the mechanism 22 to flex and thereby actuate transducing components within the housing 18 resulting ultimately in an output signal. The diaphragm 30 is mechanically connected to a piston-like rod 31 which in turn is connected to spring 32. The other end of spring 32 is secured to an adjusting screw 34. Nut 36 is threaded onto screw 34, and rests against wall 38 of housing 18. Also another nut 35 is soldered to screw 34 to keep it from turning as the nut 35 is slidably confined to the reduced size interior structure of housing 18 as illustrated in FIGS. 3, 4 and 5.

The Transducer Used to Convert the Diaphragm Flexure Into a Color Coded Light Signal As the diaphragm 30 of the vacuum linear movement mechanism 22, responds to changes in vacuum pressure of the engine intake manifold 26, a multicolored light filter 40 which is secured to its frame 42, in turn secured to piston-like rod 31, is translated within the housing 18 between a lamp 44 and the oppositely positioned light receiving end 46 of a fibre optic bundle 20. The light filter 40 is thus displaced in direct proportion to varying vacuum pressures. Green, amber and red segments of the light filter 40 are moved when vacuum pressures change into the transverse light path within the housing 18, thereby causing the color of the light transmitted through the fibre optic bundle 20 to the display lens 16 to change. As the margin between two adjacent colors transits the cross section of the light receiving end 46 of the fibre optic bundle 20, both colors are transmitted, thus achieving a gradual transition from one color to the other. Calibration is accomplished by turning the adjustment nut 36, which adjusts the effective length of the screw 34, and thereby the tension of the spring 32. Thereafter the segmentally colored elongated filter 40, alternately introduces the green, amber or red coded colors and their transition colors into the light path at appropriately selected vacuum pressure levels of the vehicle engine. The lamp or light socket assembly 48 has a heat sink accessory 49 and electrical conductors 23, 25, and it is attached to housing 18.

The Indicator Displaying the Changes in Vacuum Levels to the Vehicle Driver

As the display lens 16 changes color gradually from green, through amber to red and their transition colors, the driver may immediately perceive the increased levels of fuel consumption, and the effects of throttle settings. The location, shape and brightness of the lens 16 allows its observation through the driver's peripheral vision range, thus avoiding dangerous distractions of the driver's concentration on the roadway. The small size of the lens 16 permits easy installation at any convenient location, among the many instruments already furnished to aid the driver, or apart therefrom. Such a lens 16 generally mounted on the vehicle dashboard 19 or outside and in front of the windshield presents nearly instantaneous indications to the driver, of the effects of the throttle settings on the fuel consumption rate.

Operation of a Vehicle Engine When Using the Fuel Economy Monitoring System

A single lighted display lens 16 automatically changes color and transitions thereof, to provide an efficient and readily usable visual indicator to a vehicle operator to improve his or her throttle setting and economical driving habits. The driver's response to light changes becomes nearly automatic with minimal distraction or interpretation, as he or she adjusts throttle pressure in response to the changing color of the lens 16 as the color departs from green, through amber and especially into red.

Calibration by means of the adjusting nut 36 permits the vehicle operator to adjust the operational levels at which color changes occur to accomodate the type of vehicle engines to be monitored and/or the degree of fuel economy he or she desires. Moreover, this fuel economy monitoring system does not require an expert driver in order to attain increased gas mileage through more efficient engine operation.

We claim:

1. A fuel economy monitoring system for engines, particularly of vehicles, to monitor intake manifold vacuum of a vehicle engine being subjected to speed and load changes to obtain the most economical fuel consumption rate in keeping with the operator or driver's operating objectives, comprising, in respect to a vehicle:
   a. housing to contain many of the components and to be secured to the vehicle structure at any location;
   b. an enclosed relative pressure or vacuum diaphragm sub-assembly secured to or within the housing having a movement indicator rod projecting into the housing for translating movement therein and having a receiving structure to receive a vacuum hose coming from an intake manifold of an engine;
   c. a light filter sub-assembly within the housing secured to the diaphragm movement indicator rod of the diaphragm sub-assembly, for direct movement therewith and having multiple colored filter sections such as green, amber and red respectively, adjacent one another and in line, green indicating higher vacuum and excellent fuel economy, amber indicating lower vacuum and somewhat reasonable fuel economy, and red indicating little or no vacuum and poor fuel economy, and the transitional blended colors indicating the changeovers in status;
   d. a light sub-assembly attached to the housing and positioned to shine light through a portion at a time of the light filter sub-assembly;
   e. a light pickup sub-assembly to scan the lighted portion of the light filter sub-assembly, attached to the housing, having a fibre optic bundle sub-assembly extending from within and beyond the housing to convey the image of the scanned lighted portion of the light pickup sub-assembly to a remote location, as the extending end of the fibre optic bundle is secured to the vehicle within the peripheral field of vision of the vehicle operator, and
   f. a calibration sub-assembly, comprising in turn:
      a. an adjustment screw with an anti-rotation member mounted for translation through the end of the housing;
      b. an adjustment nut threaded on the adjustment screw externally of the housing to regulate the translation movement of the adjustment screw; and
      c. a coiled tension spring secured inside the housing between the end of the adjustment screw and the end of the diaphragm movement indicator rod, this calibration sub-assembly being utilized to match both a vehicle's engine general operating characteristics and in addition the driver's personal desires of engine fuel economy versus overall vehicle performance.

* * * * *